United States Patent
Morgan et al.

(10) Patent No.: US 11,354,115 B2
(45) Date of Patent: Jun. 7, 2022

(54) METHODS AND A SYSTEM FOR INTERFACE EXTENSIONS

(71) Applicant: NCR Corporation, Atlanta, GA (US)

(72) Inventors: Kip Oliver Morgan, Atlanta, GA (US); Alexander Arrabis Bronola, Lawrenceville, GA (US); Meenakshi Sreeraman, Waxhaw, NC (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/947,391

(22) Filed: Jul. 30, 2020

(65) Prior Publication Data

US 2022/0035625 A1 Feb. 3, 2022

(51) Int. Cl.
| | |
|---|---|
| *G06F 9/44* | (2018.01) |
| *G06F 8/656* | (2018.01) |
| *G06F 3/04812* | (2022.01) |
| *G06F 8/38* | (2018.01) |
| *G06F 9/46* | (2006.01) |
| *G06F 8/20* | (2018.01) |
| *G06Q 30/06* | (2012.01) |

(52) U.S. Cl.
CPC .......... *G06F 8/656* (2018.02); *G06F 3/04812* (2013.01); *G06F 8/20* (2013.01); *G06F 8/38* (2013.01); *G06F 9/466* (2013.01); *G06Q 30/0641* (2013.01)

(58) Field of Classification Search
CPC ... G06F 8/656; G06F 8/20; G06F 8/38; G06F 3/0481; G06F 9/466; G06F 3/04812; G06Q 30/0641; G06Q 30/0643
USPC ....................................................... 717/168
See application file for complete search history.

(56) References Cited

U.S. PATENT DOCUMENTS

| | | | | |
|---|---|---|---|---|
| 6,115,711 | A * | 9/2000 | White | G06F 8/38 |
| 7,404,177 | B1 * | 7/2008 | Greenfield | G06F 9/541 717/106 |
| 8,327,351 | B2 * | 12/2012 | Paladino | G06F 8/71 717/177 |
| 8,555,273 | B1 * | 10/2013 | Chia | G06F 8/654 717/173 |
| 9,002,574 | B2 * | 4/2015 | Garrett | H04M 1/6091 701/34.4 |

(Continued)

OTHER PUBLICATIONS

Modeling UI agents for public environments to enhance the V2oIP embedded ATM access point services author: VC Josheph published on 2005.*

(Continued)

*Primary Examiner* — Chameli Das
(74) *Attorney, Agent, or Firm* — Schwegman, Lundberg & Woessner

(57) ABSTRACT

A base transaction User Interface (UI) is provided that provides transaction processing for transactions at transaction terminals. The base UI can be customized through independent and decoupled customization/extension files, which provide specific UI customizations for UI screen content, UI screen styles, UI screen views, UI screen workflows, and UI screen resource functionality. Customizations or extensions are achieved without modifying the base UI. The customizations or extensions are dynamically obtained during execution of the base UI from the corresponding files and processed by the base UI as user-defined custom overrides.

18 Claims, 3 Drawing Sheets

(56) References Cited

U.S. PATENT DOCUMENTS

| | | | |
|---|---|---|---|
| 2003/0058277 A1* | 3/2003 | Bowman-Amuah | ......................... G06F 16/289 715/765 |
| 2009/0132966 A1* | 5/2009 | Lahiri | ..................... G06F 9/451 715/853 |
| 2015/0205595 A1* | 7/2015 | Dudai | .................... G06Q 10/00 717/168 |
| 2018/0225209 A1* | 8/2018 | Mannava | ............ G06F 12/0891 |
| 2019/0197181 A1* | 6/2019 | Li | ........................... G06F 9/466 |
| 2019/0251063 A1* | 8/2019 | Colla | ....................... G06F 16/48 |
| 2020/0394709 A1* | 12/2020 | Celia | ........................ G06N 5/04 |
| 2021/0226774 A1* | 7/2021 | Padmanabhan | ....... G06F 16/953 |

OTHER PUBLICATIONS

Title: Business-to-business e-commerce frameworks, author: SSY Shim, published on 2000.*
Title: An adaptive environment for the user interface of Excel, author: CG Thomas et al published on 1993.*
Title: Composing domain-specific design environments, author: Á Lédeczi, published on 2001.*

* cited by examiner

METHODS AND A SYSTEM FOR INTERFACE EXTENSIONS

BACKGROUND

Retailers rely on third-party vendors to provide transaction software for their businesses. That is, retailers have expertise in marketing and selling products and are not particularly adept at developing their own software systems. In fact, it would be cost ineffective for a retailer to hire teams of developers to develop proprietary transaction software for a variety of reasons For example, the Operating Systems (OSs) of retailer terminals are often updated, which requires updates to any proprietary software; bugs or errors are common and cannot be entirely eliminated such that the retailers would have to maintain some development and support staff; and the needs of the retailers are dynamic, which would require enhancements and modifications to any proprietary software of the retailers.

However, because each retailer (sometimes even specific stores or locations of stores for a single retailer) require customizations for their-line of business, products, services, procedures, and branding, each retailer still has to engage the third-party software vendor to create customized transaction software that is specific to that retailer or even specific to stores of a single retailer. This necessity of customization results in increased expense for the retailers depending upon the degree of customization that is required of the third-party vendors. The vendors have to create different versions of their core software product for each retailer and as a result may require specialized staff be available to support and maintain each customized product. Consequently, the vendors are also not thrilled with the idea of creating customizations for the retailers.

One aspect of transaction software that requires a significant amount of customization on a per-retailer or per-store basis is the transaction software's User Interface (UI), which is operated by customers during self-checkouts or by store clerks during customer-assisted checkouts. These customizations make it more difficult to migrate to newer versions of the underlying OS and/or newer versions of the vendor's transaction software. The retailer typically experience time delays when migrations to new versions are planned to occur and typically experience a variety of unexpected errors during the migrations. Migrations may be forced on the retailers by the OS vendors or the third-party transaction software vendors or the migrations may be because the retailers requested increased feature/function or performance enhancements from the transaction software vendors.

SUMMARY

In various embodiments, methods and a system for interface extensions are presented.

According to an aspect, a method for extending a user interface is presented. For example, a transaction interface is initiated on a transaction terminal. A customization or an extension associated with the transaction interface is obtained. The customization of the extension is provided within the transaction interface during a transaction at the transaction terminal.

DETAILED DESCRIPTION

Figure 1:
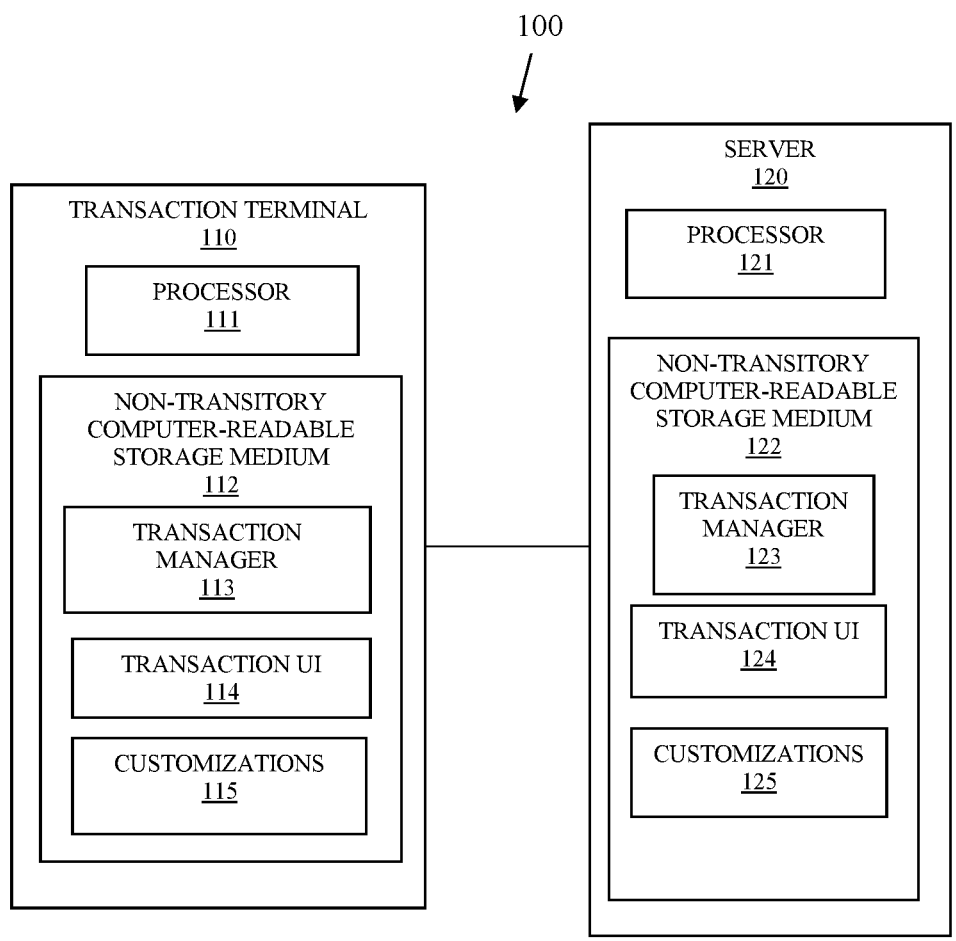
FIG. 1 is a diagram of a system for user interface extensions, according to an example embodiment.

FIG. 1 is a diagram of a system 100 for user interface extensions, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of user interface extensions presented herein and below.

As will be described more completely herein and below, system 100 permits a based User Interface (UI) to be extended with customizations and feature function. The customizations represents files and/or instructions that extend or alter the default-based UI with respect to content displayed, visual styles or themes of the UI screens, workflow sequences, screen layouts or screen views, and feature/function of UI options.

System 100 includes a transaction terminal 110 and a server 120. Terminal 110 comprises a processor 111 and a non-transitory computer-readable storage medium 112. Medium 112 comprises executable instructions for transaction manager 113, transaction UI 114, and customizations 115. Server 120 comprises a processor 121 and a non-transitory computer-readable storage medium 122. Medium 122 comprises executable instructions for transaction manager 123, transaction UI 124, and customizations 125.

It is to be noted that terminal 110 may dynamically obtain transaction UI 124 remotely from server 120, such as via a browser through browser pages. So, both the UI 124 and/or customizations 125 may be dynamically provided through the browser for execution on terminal 110. Alternatively, UI 114 and customizations 115 may be locally stored and locally executed.

Customizations 115 and 125 are files that include text representing replacement content for UI-generated strings/content, branding images, fonts, colors, workflow sequences, resource definitions (layout, and/or instructions for resource override functionality/features. The text of one customization file 115 or 125 may reference or link to another different customization file 115 or 125. Examples of text for some customization files 115 or 125 are provided below.

The customization files 115 or 125 represent overrides of default UI screen attributes, UI screen content, UI screen processing sequences, and/or UI screen option features/functions provided in the transaction UI 114 and 124.

As used herein and below an "extension" or a "customization" to the transaction UI 114 or 124 refers to a modification in a default-provided UI 114 or 124 string, style or attribute, workflow or processing sequence, screen layout, and/or feature/function logic (instruction).

The customization files 115 or 125 comprise text defining/referencing one or more extensions/customizations.

Transaction manager 113 processes a transaction at terminal 110 by using data provided by and interacting with peripheral devices (item code scanner, card reader, touch display, receipt printer, keypad, media dispenser/accepter, etc.); by using data provided by and interacting with transaction manager 123 (item descriptions for item codes provided by the item code scanner, item processing, and payment processing); and by using data provided by and interacting with transaction UI 114 or 124. States of a transaction that is processed by transaction manager 113 drive screens generated by transaction U 1114 or 124. The screens are generated by transaction UI 114 or 124 on a touch display peripheral device of terminal 110.

During processing of the transaction UI 114 or 124, the customization files 115 or 125 are dynamically acquired and processed for purposes of providing the extensions or customizations to the default transaction UI's look and feel (style—branding, colors, fonts), screen sequences, screen layout (views), UI option feature/function (logic), and screen-presented content (stings or text). That is, terminal 110 dynamically interprets or dynamically produces an executable that executes UI 114 or 124 with customization files 115 or 125.

UI 114 or 124 is provided as a base set of UI rendered screens that corresponding to transaction processing associated with transaction manager 113. The UI 114 or 124 is implemented so as to allow dynamic interpretation and/or execution of the extensions/customizations defined in the customization files 115 or 125. In an embodiment, the source code for UI 114 or 124 is open source and object-based providing object inheritance and method overrides of methods of the corresponding objects.

An example, implementation is now discussed utilizing Unicode override files representing the customization files 115 or 125 for purposes of illustration. It is noted that other programming languages may be used without departing from the teachings provided herein and below.

System 100 provides five different levels of extensions/customizations: 1) strings (text or content overrides); 2) styles (branding, image, colors, fonts, and/or visual themes overrides); 3) workflow (processing sequencing of UI screens); 4) views (screen layout overrides); and 5) business logic (for feature/function overrides of UI screen options or object method overrides).

The base overridable UI 114 or 125 may have resources (objects) and resource attributes/content (object attributes/content) via customization files 115 or 125. A file path to obtain these files 115 or 125 is specified in UI 114 of 124 configuration and as an example may appear as follows:
SSCOStrings.es-MX.custom.dat The es-MX.custom.dat specifies the local (geographic location) that the corresponding configuration files 114 or 124 are provided for. Here, "es" refers to Spanish and "MX" refers to a Mexican dialect. The content of the corresponding configuration file 114 or 124 may appear (in the running example) as follows:
ScotApp_9501=Veficar edad.
ScotApp_9502=Cálculo de edad.
ScotApp_9503=Esanee con Yoti para verificar su edad
ScotApp_9504=Escanee con Yoti para verificar su edad o continúe con la compra y valide posteriormente.
ScotApp_9505=Verificación de edad.
ScotApp_9506=Use la cámara—Tengo más de % d años.
ScotApp_9507=Mire a la cámara.

Each line in the file 114 or 124 includes a new entry. The left side of each line specifies the string key, while the right side is the Unicode text to use in place of what the base application provides for that key. These entries represent an example mechanism by which content overrides are achieved.

An example for achieving style overrides (images, colors, fonts, themes) rendered in UI screens are provided as follows. Normally changing colors and images across an entire application requires coding or modifying complex data structures, such as Cascading Style Sheets (CSS). By using Syntactically Awesome Style Sheets (SASS), a flat level of overrides is created, which modify the most common things that need changing in the UI 114 or 124. These common things include the main colors of the UI screens, secondary colors of the UI screens, background images, and branding/logo images. An example format of this file 115 or 125 for achieving style UI overrides may appear as follows:

```
//new additional color
$my-color: #ccc;
:export {
    myMainColor: $my-color;
}
```

This is in a SASS format and is part of SASS; it allows variables to be declared for each of the common overrides associated with style of the UI screens rendered by the UI 114 or 124. All image paths, margins, and colors are defined in the UI 114 or 124 as object attributes that can be overridden when a corresponding customization file 115 or 125 is present.

An example for achieving workflow overrides (the sequence of screens presented to the user from the UI 114 or 124) is as follows. Some transaction UIs start by asking for a loyalty number of the customer/user; some go to an option for the customer to search for an item; others may start with a scan item screen. The main business logic (feature/function overrides discussed below) includes a concept of a context, which is the "state" the business engine (transaction manager 113) is in. Many concepts are represented within the UI 114 or 124 by a similar looking view for the corresponding UI screen. The state of transaction manager 113 depends on terminal 110 and server 120. These contexts/states are mapped via a customization file 115 or 125. In addition to what view a context maps to, a parameter is given to distinguish between contexts that map to a same view. Regular expressions are supported for the name of the context within the corresponding customization file 115 or 125. Example contents of a workflow override customization file 115 or 125 may appear as follows:

```
{
"context":"QuickPickItems",
"view":"Sale"
"parm":"QuickPick"
},
{
"context":"ScanAndBag",
"view":"Sale",
"parm":"Sale"
},
{
"context":"BagAndEAS",
"view":"Sale",
"parm":"BagItem",
},
```

These statements instruct the UI 114 or 124 to load the Sale View UI screen for 3 contexts with a different parameter. By changing this customization file 115 or 125, the entire sequence of the UI screens that are displayed can be custom adjusted. Each UI screen has standard data fields such as instructions, title text, shopping cart, and buttons that are populated. This allows for a high degree of interchangeability between screens.

An example for achieving view overrides is as follows. While colors, images, and branding (style) of each view can be customized and changed from what is provided in the UI 114 or 124, sometimes adding buttons (UI feature/function options) or changing the layout of a rendered UI screen is desired. An overlay or replacement mechanism is provided that allows resources to be added on top of base views, or completely replacing the base views. A capability is also provided to bring in completely customized views into the UI 114 or 124. Furthermore, if the override view indicates that it would like to hide the base view, nothing from that base view is rendered or displayed by the UI 114 or 124. Example contents of a customization file 115 or 125 for a view override may appear as follows:

```
{code}
/**
*This is the only place where you import
* any override view components.
* This will be imported within mainFrame.tsx only
*/
import Welcome from "./views/customWelcome";
//name here should match with its base view
Export { Welcome };
{code}
```

The property/attribute to set inside of the view override if the base view is to be hidden is called hideBaseView.

```
{code}
CustomWelcome.defaultProps = {
hideBaseView : true
};
export default view(CustomWelcome);
{code}
```

The main frame is structured in a way to use the view from the base if it exists and overlay on top of it a customized view if it exists.

An example for achieving for achieving business logic overrides (feature/function of UI options or object methods) is as follows. In addition to changing views, it is sometimes desirable to change the logic (source code) of what existing buttons (UI options or screen object methods) for the base UI 114 or 124. Also, when a custom view adds new buttons, they need to be given the corresponding new functionality while retaining the functionality of the base view. This is accomplished by using a model override system. All views are attached to models, which is where all the logic is contained or maintained. If a model override is detected, the override will normally inherit everything from the base view, with the ability to change or add new methods (functions). A model override for business logic overrides may appear as follows:

```
{code}
    import { store } from "react-easy-state";
    import WelcomeModel from
"*../../components/views/welcome/welcomeModel";
        class OverrideWelcomeModel extends WelcomeModel {
        public isOpen : boolean = false;
        constructor( ) {
        super( );
        console.log("From OverrideWelcomeModel constructor");
        }
        setOpen(isOpen) {
        this.isOpen = isOpen;
        }
        }
```

```
const overrideWelcomModel = new
OverrideWelcomeModel( );
export default store(overrideWelcomeModel);
{code}
```

This adds functionality in a 'setOpen' method while keeping everything (existing provided functionality) from the base UI Welcome screen.

System 100 permits a novel base U 1114 or 124 to be dynamically customized with the five noted extensions/customizations via the customization files 115 or 125. This is done without modifying and without changing the base source code associated with UI 114 or 124. Consequently, transaction UIs can be customized by retailer or by specific locations or specific stores of a single retailer through a base provided UI 114 or 124 along with the customization files 115 or 125. This makes migrating to newer versions of an OS for terminal 110 easier to achieve since only the UI 114 or 124 needs migrated for the retailers. This also allows enhancements and improved functionality desired by a given retailer to be isolated in a corresponding customization file 115 or 125, which speeds release of the enhancements and which decouples that retailer's enhancements from the base provided UI 114 or 124. As a result, development, maintenance, and support of the UI 114 or 124 is improved over what is available for traditionally provided transaction UIs.

In an embodiment, terminal 110 is a Point-Of-Sale (POS) terminal, a Self-Service Terminal (SST), an Automated Teller Machine (ATM), or a mobile device (such as a phone or a tablet that performs transactions).

These embodiments and other embodiments are now discussed with reference to FIGS. 2-3.

Figure 2:
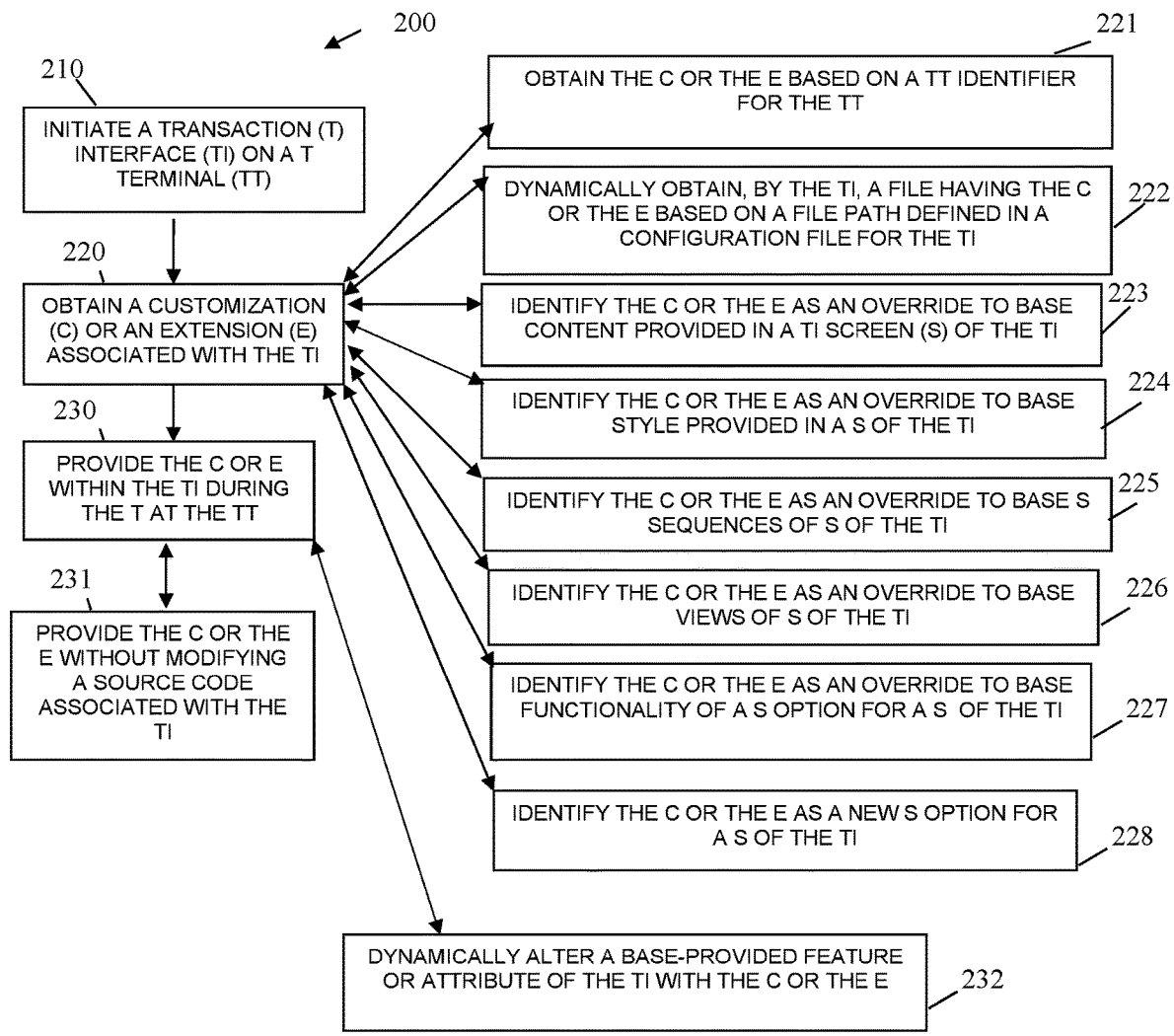
FIG. 2 is a diagram of a method for user interface extensions, according to an example embodiment.

FIG. 2 is a diagram of a method 200 for user interface extensions, according to an example embodiment. The software module(s) that implements the method 200 is referred to as a "dynamic transaction UI." The dynamic transaction UI is implemented as executable instructions programmed and residing within memory and/or a non-transitory computer-readable (processor-readable) storage medium and executed by one or more processors of a device. The processor(s) of the device that executes the dynamic transaction UI are specifically configured and programmed to process the dynamic transaction UI. The dynamic transaction UI has access to one or more network connections during its processing. The network connections can be wired, wireless, or a combination of wired and wireless.

In an embodiment, the device that executes the dynamic transaction UI is transaction terminal 110. In an embodiment, transaction terminal 110 is a POS terminal, an SST terminal, an ATM, a phone, or a tablet computer.

In an embodiment, the dynamic transaction UI is all of or some combination of 113, 114, 115, 124, and/or 125.

At 210, the dynamic transaction UI initiates a transaction interface on a transaction terminal. Initiation can be automatic when the transaction terminal is booted or powered on in a transaction processing mode of operation, which can be self-service, or cashier assisted. In an embodiment, initiation is processed by transaction manager 113 upon startup or initiation of transaction manager 113 on terminal 110.

At 220, the dynamic transaction UI obtains a customization, or an extension associated with the transaction interface. The customization or extension is one or more text-based statements and/or instructions defined in customization files 114 or 124 as was discussed above with the FIG. 1.

In an embodiment, at 221, the dynamic transaction UI obtains the customization, or the extension based on a transaction terminal identifier for the transaction terminal. The identifier may be linked to a specific retailer or a specific retailer store/geographical location.

In an embodiment, at 222, the transaction interface dynamically obtains a file having the customization or the extension based on a file path defined in a configuration file for the transaction interface.

In an embodiment, at 223, the dynamic transaction UI identifies the customization or the extension as an override to base content (text) provided in a transaction interface screen of the transaction interface.

In an embodiment, at 224, the dynamic transaction UI identifies the customization of the extension as an override to a base style provided in a screen rendered by the transaction interface.

In an embodiment, at 225, the dynamic transaction UI identifies the customization or the extension as an override to base screen sequences of screens rendered by the transaction interface.

In an embodiment, at 226, the dynamic transaction UI identifies the customization or the extension as an override to base views of a screen or set of screens rendered by the transaction interface.

In an embodiment, at 227, the dynamic transaction UI identifies the customization or the extension as an override to base functionality of a screen option (object method, resource, button, field, menu, etc.) for a screen rendered by the transaction interface.

In an embodiment, at 228, the dynamic transaction UI identifies the customization or the extension as a new screen option for a screen rendered by the transaction interface.

At 230, the dynamic transaction UI provides the customization or the extension within the transaction interface during the transaction at the transaction terminal.

In an embodiment, at 231, the dynamic transaction UI provides the customization or the extension without modifying a source code associated with the transaction interface. That is, the transaction interface does not require any modification or changes to implement and provide the customization of the extension.

In an embodiment, at 232, the dynamic transaction UI dynamically alters a base provided feature or attribute of the transaction interface with the customization of the extension.

Figure 3:
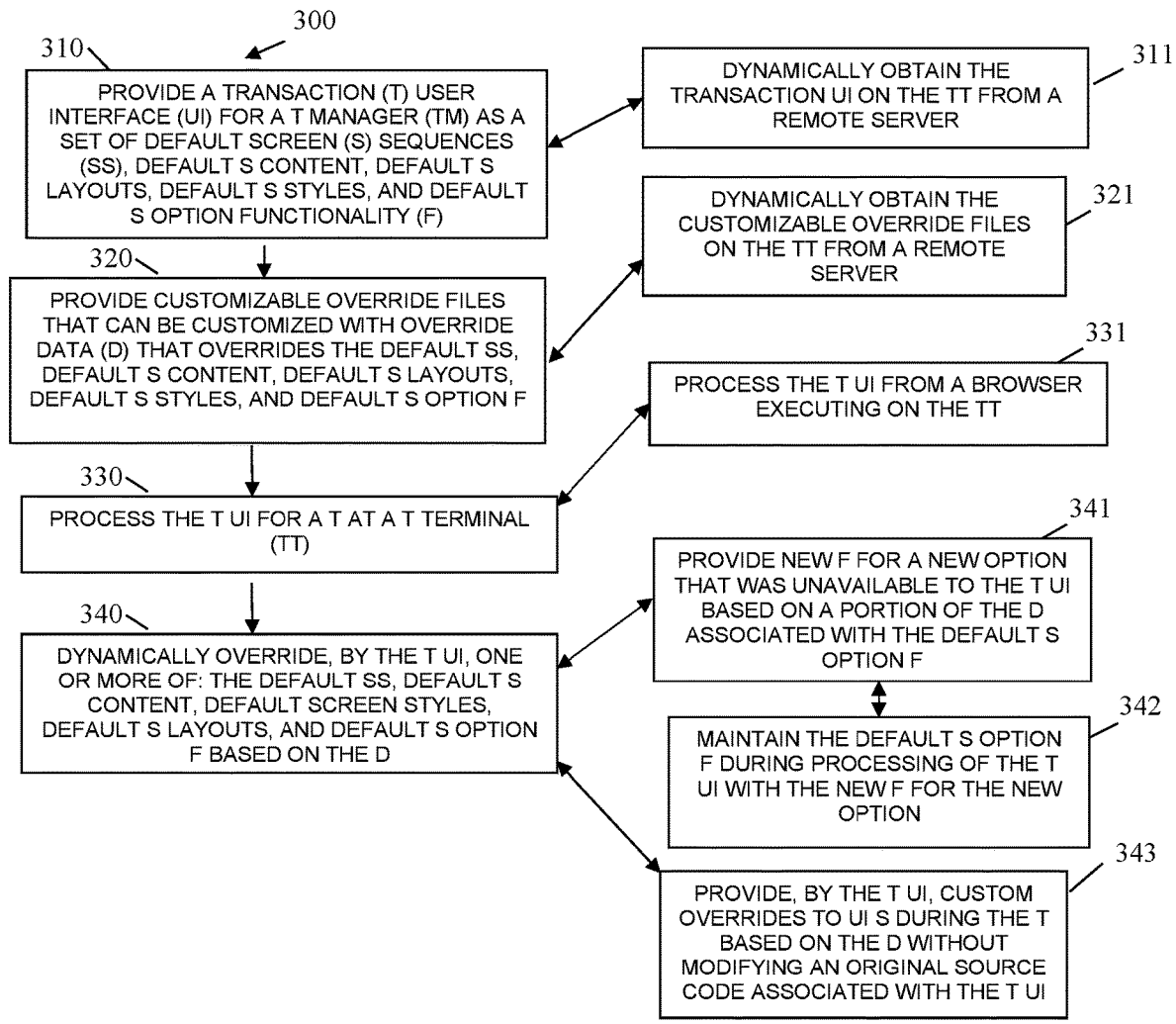
FIG. 3 is a diagram of another method for user interface extensions, according to an example embodiment.

FIG. 3 is a diagram of another method 300 for user interface extensions, according to an example embodiment. The software module(s) that implements the method 300 is referred to as a "transaction interface manager." The transaction interface manager is implemented as executable instructions programmed and residing within memory and/or a non-transitory computer-readable (processor-readable) storage medium and executed by one or more processors of a device. The processors that execute the transaction interface manager are specifically configured and programmed to process the transaction interface manager. The transaction interface manager has access to one or more network connections during its processing. The network connections can be wired, wireless, or a combination of wired and wireless.

In an embodiment, the device that executes the transaction interface manager is transaction terminal 110. In an embodiment, transaction terminal 110 is a POS terminal, a SST, an ATM, a phone, or a tablet computer.

In an embodiment, the transaction interface manager is all or some combination of 113, 114, 115, 124, 125, and/or the method 200.

The transaction interface manager presents another and, in some ways, enhanced processing perspective to that which was described above with the FIG. 2.

At 310, the transaction interface manager provides a transaction UI for a transaction manager as a set of default screen sequences, default screen content, default screen layouts, default screen styles, and default screen option functionality.

In an embodiment, at 311, the transaction interface manager dynamically obtains the transaction UI on the transaction terminal from a remote server.

At 320, the transaction interface manager provides customizable override files that can be customized with override data that overrides the default screen sequences, the default screen content, the default screen layouts, the default screen styles, and the default screen option functionality.

In an embodiment, at 321, the transaction interface manager dynamically obtains the customizable override files on the transaction terminal from a remote server (remotely located from the transaction terminal).

At 330, the transaction interface manager processes the transaction UI for a transaction being conducted on or at the transaction terminal.

In an embodiment, at 331, the transaction interface manager processes the transaction UI from a browser executing on the transaction terminal.

At 340, the transaction UI overrides one or more of: the default screen sequences, the default screen content, the default screen layouts, the default screen styles, and the default screen option functionality based on the override data obtained from the customizable override files.

In an embodiment, at 341, the transaction interface manager provides new functionality for a new option that was unavailable to the transaction UI based on a portion of the override data associated with the default screen option functionality.

In an embodiment of 341 and at 342, the transaction interface manager maintains the default screen option functionality during processing of the transaction UI with the new functionality for the new option.

In an embodiment, at 343, the transaction UI provides custom overrides to UI screens being rendered by the transaction UI during the transaction based on the override data without modifying an original source code associated with the transaction UI.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   initiating a transaction interface on a transaction terminal, wherein the transaction interface comprises a base user-interface and an overridable User Interface (UI);
   obtaining a customization associated with the transaction interface or an extension associated with the transaction interface that overrides a portion of the base user-interface and overridable UI; and
   providing the customization of the extension within the transaction interface during a transaction at the transaction terminal by dynamically interpreting and processing the customization or the extension as an executable for the transaction interface is executed and without modifying a base user-interface source code and without modifying an overridable UI source code associated with the transaction interface.

2. The method of claim 1, wherein obtaining further includes obtaining the customization or the extension based on a transaction terminal identifier for the transaction terminal.

3. The method of claim 1, wherein obtaining further includes dynamically obtaining, by the transaction interface, a file having the customization, or the extension based on a file path defined in a configuration file for the transaction interface.

4. The method of claim 1, wherein obtaining further includes identifying the customization or the extension as an override to base content provided in a transaction interface screen of the transaction interface.

5. The method of claim 1, wherein obtaining further includes identifying the customization or the extension as an override to a base style presented for transaction screen interfaces of the transaction interface.

6. The method of claim 1, wherein obtaining further includes identifying the customization or the extension as an override to base sequences of transaction interface screen sequences of the transaction interface.

7. The method of claim 1, wherein obtaining further includes identifying the customization or the extension as an override to base views of transaction interface screens of the transaction interface.

8. The method of claim 1, wherein obtaining further includes identifying the customization or the extension as an override to base functionality of a transaction interface screen option for a transaction interface screen of the transaction interface.

9. The method of claim 1, wherein obtaining further includes identifying the customization or the extension as a new transaction interface screen option for a transaction interface screen of the transaction interface.

10. The method of claim 1, wherein providing further includes dynamically altering a base-provided feature or attribute of the transaction interface with the customization or the extension.

11. A method, comprising:
    providing a transaction user interface (UI) for a transaction manager as a set of default UI screens provided with default screen sequences, default screen content, default screen layouts, default screen styles, and default screen option functionality, wherein the transaction UI comprises a base source code and an overridable source code;
    providing customizable override files that are customized with override data that overrides for the default screen sequences, the default screen content, the default screen layouts, the default screen styles, and the default screen option functionality;
    processing the transaction UI for a transaction at a transaction terminal; and
    dynamically overriding, by the transaction UI, the default screen sequences, the default screen content, the default screen layouts, the default screen styles, and the default screen option functionality by dynamically interpreting and processing the override data without modifying the base source code and without modifying the overridable source code associated with the transaction UI.

12. The method of claim 11, wherein providing the transaction UI further includes dynamically obtaining the transaction UI on the transaction terminal from a remote server.

13. The method of claim 11, wherein providing the customizable override files further includes dynamically obtaining the customizable override files on the transaction terminal from a remote server.

14. The method of claim 11, wherein processing further includes processing the transaction UI from a browser executing on the transaction terminal.

15. The method of claim 11, wherein dynamically overriding further includes providing new functionality for a new option that was unavailable to the transaction UI based on a portion of the override data associated with the default screen option functionality.

16. The method of claim 15, wherein providing the new functionality further includes maintaining the default screen option functionality during processing of the transaction UI with the new functionality for the new option.

17. A system, comprising:
    a transaction terminal comprising a processor and a non-transitory computer-readable storage medium:
    the non-transitory computer-readable storage medium comprising customization files and executable instructions for a transaction User Interface (UI), wherein the transaction UI comprises a base source code and an overridable source code;
    each customization file comprising text and instructions for custom overrides to the transaction UI;
    the transaction UI executed by the processor from the non-transitory computer-readable storage medium causing the processor to perform processing comprising:
        dynamically obtain the customization files upon initiation on the transaction terminal during a transaction being processed on the transaction terminal; and
        dynamically implement the custom overrides during the transaction to change default content, default screen sequences for screens rendered on a display of the transaction terminal, default screen styles, default screen layouts, and default screen option functionality that are provided by the transaction UI without modifying the base source code and without modifying the overridable source code associated with the transaction UI by dynamically interpreting and processing each customization file.

18. The system of claim 17, wherein the transaction terminal is a Point-Of-Sale (POS) terminal, a Self-Service Terminal (SST), an Automated Teller Machine (ATM), a phone, or a tablet computer.

\* \* \* \* \*